US007976393B2

(12) United States Patent
Haga et al.

(10) Patent No.: US 7,976,393 B2
(45) Date of Patent: Jul. 12, 2011

(54) BUTTON PANEL MOUNT FOR A GAMING MACHINE CABINET

(75) Inventors: Matthew H. Haga, Austin, TX (US); Frank C. DeSimone, Henderson, NV (US); Leroy H. Gutknecht, Las Vegas, NV (US)

(73) Assignee: Multimedia Games, Inc., Austin, TX (US)

( * ) Notice: Subject to any disclaimer, the term of this patent is extended or adjusted under 35 U.S.C. 154(b) by 907 days.

(21) Appl. No.: 11/941,628

(22) Filed: Nov. 16, 2007

(65) Prior Publication Data

US 2008/0132340 A1 Jun. 5, 2008

Related U.S. Application Data

(60) Provisional application No. 60/866,159, filed on Nov. 16, 2006.

(51) Int. Cl.
*G06F 17/00* (2006.01)

(52) U.S. Cl. ........................................................ 463/46

(58) Field of Classification Search .................... 463/46, 463/36, 20–25, 47, 11; 273/143 R, 148 R, 273/138.1, 138.2; 345/156
See application file for complete search history.

(56) References Cited

U.S. PATENT DOCUMENTS 3,940,136 A 2/1976 Runte
4,279,397 A 7/1981 Larsson
4,805,906 A 2/1989 Wiczer et al.
5,415,955 A 5/1995 Kobayashi et al.
5,583,743 A 12/1996 Levins et al.
6,102,394 A 8/2000 Wurz et al.
6,231,446 B1 5/2001 Majima et al.
6,582,150 B1 6/2003 Davis et al.
6,886,896 B2 5/2005 Hedrick et al.
6,997,810 B2 2/2006 Cole
7,686,694 B2 * 3/2010 Cole .............................. 463/46
2003/0107530 A1 * 6/2003 Motegi et al. ..................... 345/6
2004/0018877 A1 1/2004 Tastad et al.
2004/0204233 A1 * 10/2004 Saffari et al. .................. 463/25
2004/0204244 A1 * 10/2004 Rathsack et al. ................ 463/42
2008/0119289 A1 * 5/2008 Lind et al. ....................... 463/46
2009/0197684 A1 * 8/2009 Arezina et al. .................. 463/42

* cited by examiner

*Primary Examiner* — Ronald Laneau
(74) *Attorney, Agent, or Firm* — Nathan H. Calvert; Russell D. Culbertson; The Culbertson Group, P.C .

(57) ABSTRACT

A gaming machine cabinet has a cabinet door is pivotaliy connected thereto and movable between a closed and open positions. A cabinet door button panel includes a panel support surface opposite the door's inner side, a capture structure at a first boundary of a button panel opening, and a blocking structure at a button panel second boundary opposite the first boundary. A button panel base has a first edge received in a button panel frame capture structure, and second edge received on the panel support surface. A locking flange with a locking projection extends from the button panel base lower side, the locking projection moveable between extended and retracted positions. With the button panel base in an operating position, a locking projection may he placed in the extended position to contact the blocking structure and thereby retain the button panel base in the operating position.

13 Claims, 6 Drawing Sheets

BUTTON PANEL MOUNT FOR A GAMING MACHINE CABINET

CROSS-REFERENCE TO RELATED APPLICATION

The Applicants claim the benefit, under 35 U.S.C. §119(e), of U.S. Provisional Patent Application No. 60/866,159 filed Nov. 16, 2006, and entitled "Button Panel Mount for a Gaming Machine Cabinet." The entire content of this provisional application is incorporated herein by this reference.

TECHNICAL FIELD OF THE INVENTION

This invention relates to gaming machines used to present results in wagering games. More particularly, the invention relates to a button panel and button panel mounting arrangement for use in gaming machines.

BACKGROUND OF THE INVENTION

Numerous different types and styles of gaming machine cabinets have been developed for implementing various types of wagering games. There are stand-alone upright gaming machine cabinets, upright pedestal-mounted cabinets, and slant-top style cabinets for example. Each of these types of gaming machine cabinets are designed to support or enclose a number of components required to implement a given type of game. Gaming machine cabinets generally include some arrangement for supporting a display device that is used to display a result for a play in a game. The display device may include one or more mechanical reels or a video display device for generating images to simulate spinnable reels, player cards, or other elements used in a given game. Various player controls or input devices are also supported by the gaming machine cabinet for allowing the player to make various inputs required to participate in the various games that may be offered at the gaming machine. Various types of physical buttons are commonly used as input devices for a gaming machine. These physical buttons may be actuated by a player to select a wager level for a given play in a game, select active pay lines for reel-type games, select hold cards or cards to be discarded in playing card games, activate information menus, and initiate game plays, for example.

Physical buttons for a gaming machine may be mounted directly on the gaming machine cabinet. However, most modern gaming machines locate the various physical buttons on a button panel that is secured in some fashion to the gaming machine cabinet. Such button panels are commonly mounted so as to form a ledge that projects forwardly from a plane of the display device. Also, gaming machine button panels are commonly mounted on a front door of the gaming machine cabinet. The cabinet door may be hinged or otherwise supported on the remainder of the gaming machine cabinet so that it may be readily moved between a closed operating position and an open position in which the interior components of the gaming machine are accessible for maintenance.

Gaming machine button panels have been mounted from outside of the gaming machine cabinet using screws or other fasteners. These button panel mounting arrangements may include a bezel or other trim piece to cover the fasteners to improve the appearance of the gaming machine. Gaming machine button panels have also been mounted from the inside of the gaming machine cabinet using screws or other types of fasteners. Prior art button panel mounting arrangements suffer from the fact that tools such as screwdrivers are required in order to remove the fasteners holding the button panel in place. Other types of tools may be required for removing trim pieces prior to removing the button panel fasteners. The small fasteners are easily misplaced during a maintenance operation and replaced in order to reassemble the gaming machine to place it back in service.

There remains a need in the gaming industry for a button panel mounting arrangement that allows the button panel to be installed and removed quickly and easily, preferably without requiring tools. Any such button panel mounting arrangement must be robust to withstand the rigors of use and must securely hold the button panel in place to prevent unauthorized access to the interior components of the gaming machine.

SUMMARY OF THE INVENTION

The present invention provides a button panel mounting arrangement that overcomes the above-described problems and others associated with prior button panel mounting arrangements. The invention encompasses a button panel mounting arrangement, a gaming machine incorporating the button panel mounting arrangement, and a method for installing a gaming machine button panel.

One preferred gaming machine according to the present invention includes a cabinet defining an interior volume and a front opening. A cabinet door is pivotally connected to the cabinet so as to be pivotable between a closed position covering at least a portion of the front opening and an open position in which an inner side of the door is accessible from outside of the cabinet. A button panel frame defines a button panel opening on the door, and includes a panel support surface facing oppositely to the inner side of the door, a capture structure at a first boundary of the button panel opening, and a blocking structure located at a second boundary of the button panel opening opposite to the first boundary. This preferred form of gaming machine also includes a button panel base having an upper side and a lower side, and opposing first and second edges. The button panel base is sized so that when the first edge is received in the capture structure of the button panel frame the second edge may be received on the panel support surface at the second boundary of the button panel opening. A locking flange extends from the lower side of the button panel base and has at least one locking projection mounted thereon. Each locking projection is moveable between an extended position and a retracted position. With this structure, when the button panel base is in an operating position in which the first edge of the button panel base is received in the capture structure of the button panel frame and the second edge of the button panel base is received on the panel support surface at the second boundary of the button panel opening, at least one of the locking projections may be placed in the extended position to contact the blocking structure and thereby retain the button panel base in the operating position.

One preferred method of installing a button panel in a gaming machine includes positioning the button panel base above the button panel frame on the door while the door is in the open position. This preferred method then includes positioning a first edge of the button panel base in the capture structure on the first boundary of the frame opening. With the first edge of the button panel base positioned in the capture structure, a second edge of the button panel base is rotated about the first edge of the button panel base held in the capture structure until the second edge of the button panel base contacts the support surface. The locking projection located beneath the button panel base is then placed in the extended position to engage the blocking structure associated with the button panel frame. This engagement between the locking projection and the blocking structure prevents the button panel base from being removed from the support surface of the button panel frame.

These and other advantages and features of the invention will be apparent from the following description of preferred embodiments, considered along with the accompanying drawings.

DESCRIPTION OF PREFERRED EMBODIMENTS

Figure 1:
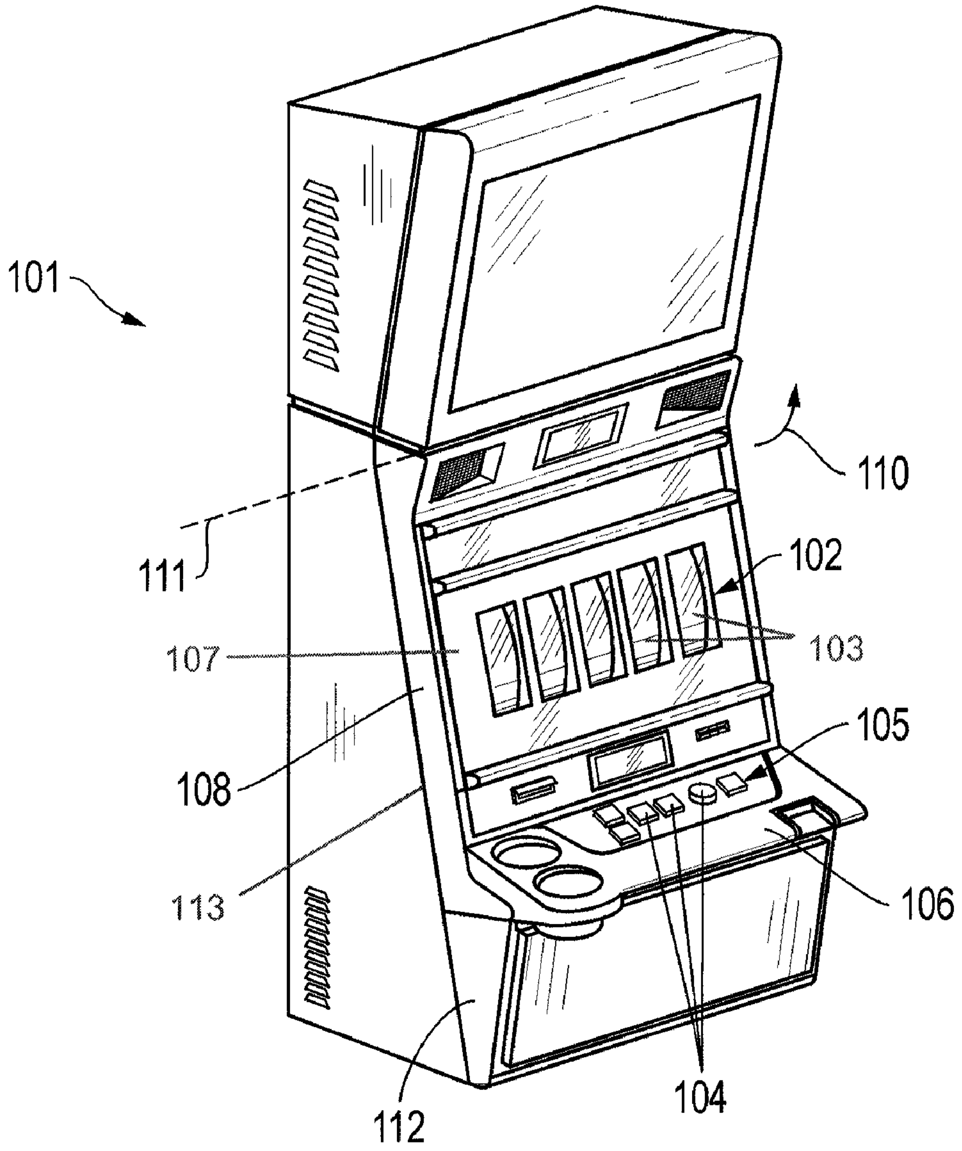
FIG. 1 is a perspective view of a gaming machine in which a button panel embodying the principles of the present invention is mounted.

Referring to FIG. 1, a gaming machine 100 includes a cabinet 101 which holds a display device 102 for displaying results in various games of chance or other games. In this particular example gaming machine 100, display device 102 includes a set of mechanical spinnable reels 103 mounted within a volume defined by cabinet 101 behind a viewing panel 107. Viewing panel 107 defines a plane of display device 102. Other forms of gaming machines within the scope of the invention may include a video monitor for displaying game results. Such a video monitor would replace display device 102 and the outer surface of the video monitor would represent the plane of the display device in that case. Gaming machine 100 also includes a set of mechanical buttons or other input devices 104 mounted on a button panel 105. Button panel 100 together with an armrest 106 form a ledge that extends forwardly from the plane of display device 102. The structure making up armrest 106 forms a frame for button panel 105 as will be described further below.

Button panel 105 and armrest 106 are mounted on a main door 108 of gaming machine 100. This main door 108 is hinged on gaming machine cabinet 101 so as to open upwardly in the direction shown by arrow 110 by pivoting about a pivot axis 111. It should be noted here that any terms indicating relative position used in this disclosure and the accompanying claims such as “upper,” “upwardly,” “lower,” “bottom,” for example are used with reference to the position of gaming machine 100 and button panel 105 shown in FIG. 1. FIG. 1 shows main door 108 in its closed position in which it covers a portion of a front opening of cabinet 101. One lateral border of the cabinet opening is shown generally at line 113. In the open position of main door 108, with the door pivoted upwardly about pivot axis 111, it will be appreciated that the front opening of cabinet 101 is exposed and that the inner side of the main door is accessible from outside of the cabinet.

Those skilled in the art will appreciate that in other arrangements for a gaming machine, the main door such as door 108 may be hinged at the side to open to the left or right rather than open upwardly. Also, button panel 105 and armrest 106 may alternatively be mounted on a lower door of the gaming machine such as door 112 which may be hinged to cabinet 101 to open downwardly or to the left or right. It is also possible that armrest 106 and button panel 105 may not be mounted on a door of the gaming machine. The present invention is not limited to any particular type of gaming machine door or mechanism that allows the door to be moved between the open and closed position. A button panel mounting arrangement according to the invention may be mounted on any portion of the gaming machine having an inner side that is accessible from the outside of the gaming machine when the gaming machine is open for servicing.

Figure 2:
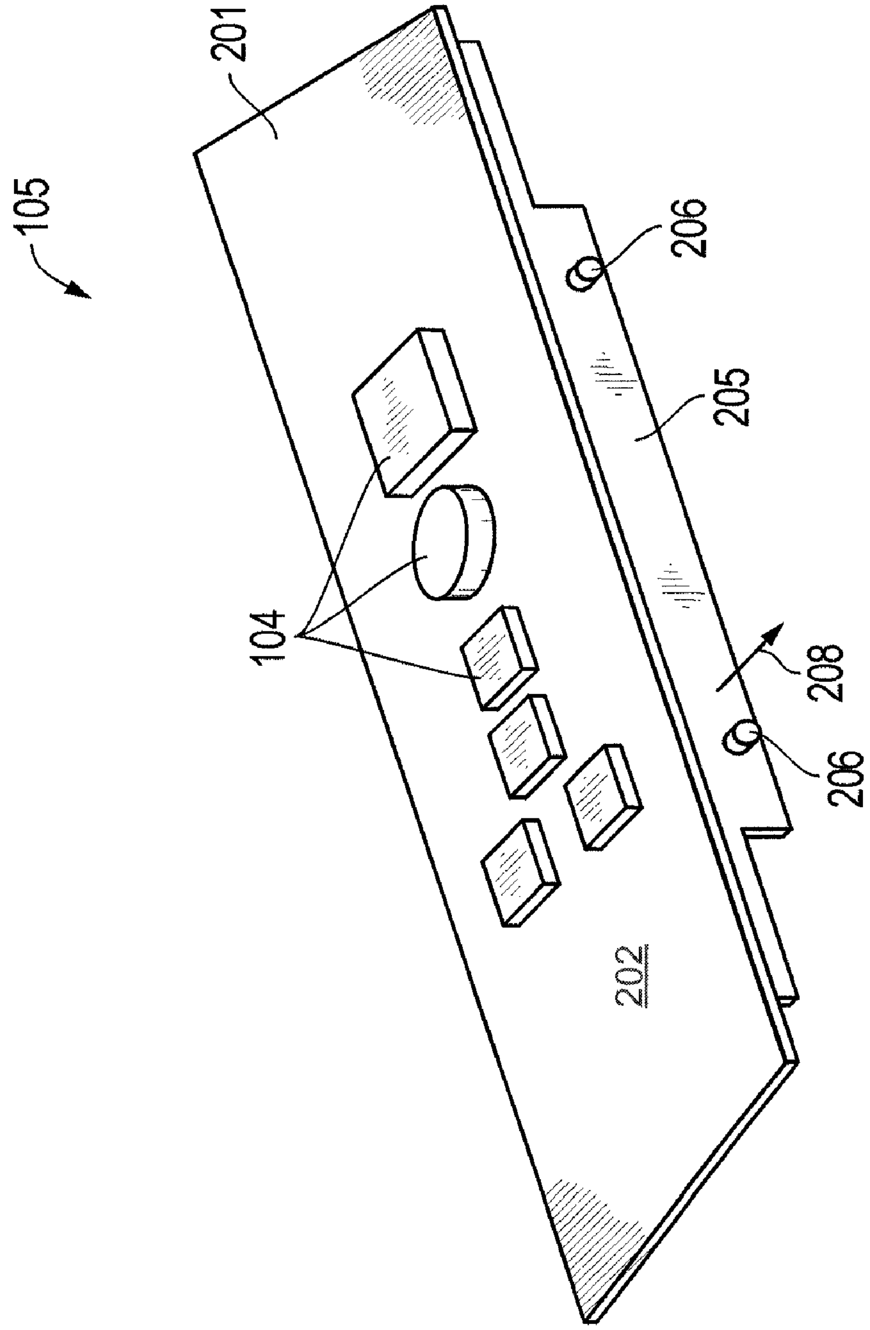
FIG. 2 is a view in perspective of a button panel embodying the principles of the invention.
Figure 3:
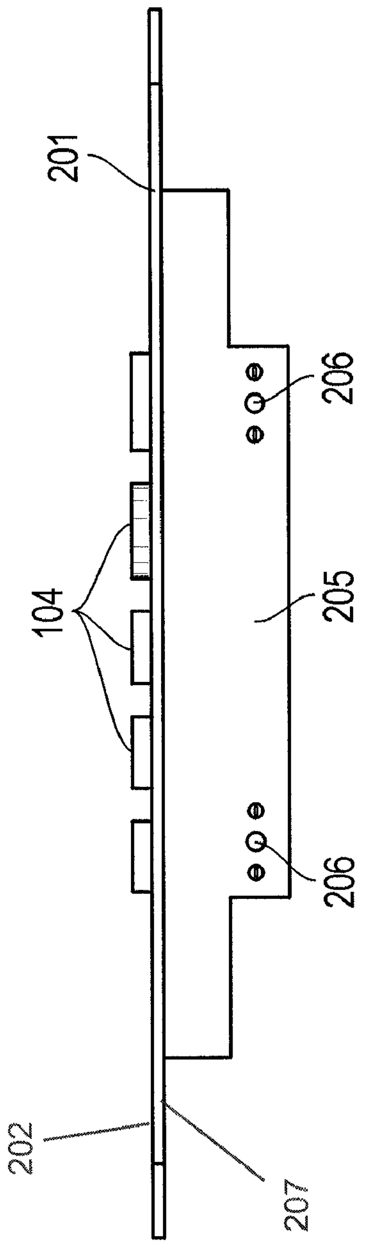
FIG. 3 is a front elevation of the button panel shown in FIG. 2.
Figure 4:
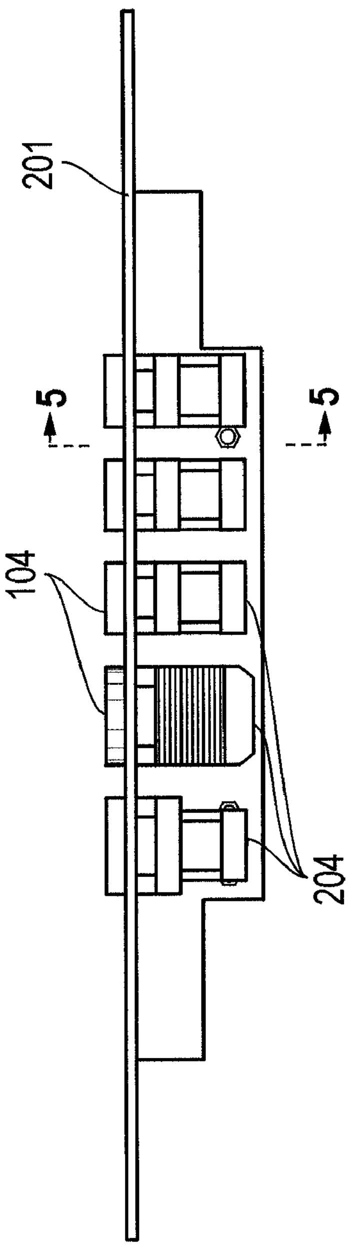
FIG. 4 is a rear elevation of the button panel shown in FIG. 2.

FIGS. 2 through 4 show button panel 105 removed from gaming machine 100. As shown in these figures, button panel 105 includes a base 201 which comprises a thin sheet of material such as steel, rigid plastic, or other suitable rigid material. The top surface (upper side) 202 of button panel base 201 may be chromed or include some other decorative coating. Button panel base 201 includes openings for receiving buttons 104. As shown best in FIG. 4, buttons 104 are each associated with a respective electrical component 204 which resides below button panel base 201.

FIGS. 2 through 4 also show that button panel 105 includes a locking flange 205 which extends downwardly from a bottom surface (lower side) 207 of button panel base 201. In the illustrated form of the invention, locking flange 205 comprises a rigid sheet of material that extends generally perpendicularly to the plane of button panel base 201. According to the present invention, locking flange 205 supports two laterally spaced apart locking projections 206 which extend from one side of locking flange 205. Each locking projection 206 is movable along an axis extending perpendicularly to the plane of locking flange 205. In particular, each locking projection 206 is preferably biased by a spring or other suitable biasing device in the direction shown by arrow 208 in FIG. 2. Each locking projection 206 is retractable from the extended position shown in FIG. 2 in the direction opposite to arrow 208. Retracting the locking projections 206 from their extended position shown in FIG. 2 allows button panel 105 to be released from its installed operating position as will be described further below.

Figure 5:
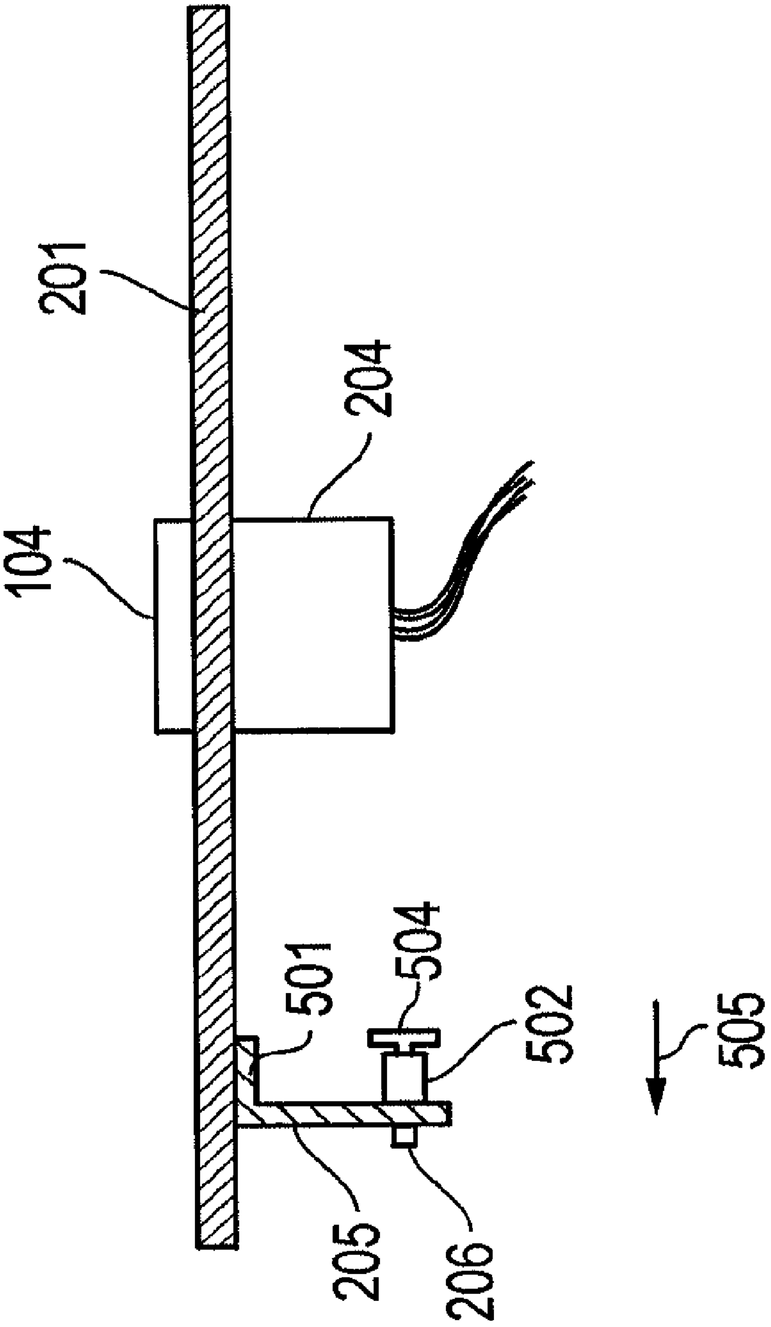
FIG. 5 is a section view taken along line 5-5 in FIG. 4.

The section view of FIG. 5 shows button panel base 201, locking flange 205, and one of the locking projections 206. A button 104 and its corresponding electrical component 204 are also visible in the section view of FIG. 5. FIG. 5 also shows that locking flange 205 includes an angle portion 501 which allows the locking flange to be connected to base 201. The section view of FIG. 5 also shows a housing 502 and a knob 504 associated with the one locking projection 206 that is visible in this view. Housing 502 is fixed to locking flange 205 in a suitable fashion and, in this preferred form of the invention, houses a biasing device (not shown) such as a suitable spring to bias both locking projection 206 and knob 504 to the left in the figure in the direction of arrow 505. Knob 504, which is connected to or integrally formed with the material making up locking projection 206, may be moved to the right in the orientation of FIG. 5 against the force of the biasing device associated with housing 502 to retract the locking projection 206. Releasing knob 504 allows the biasing device to again move both the knob 504 and locking projection 206 to the position shown in FIG. 5. It will be noted that a similar arrangement of housing 502 and 504 is associated with the other locking projection 206 which is not visible in the section view of FIG. 5.

Figure 6:
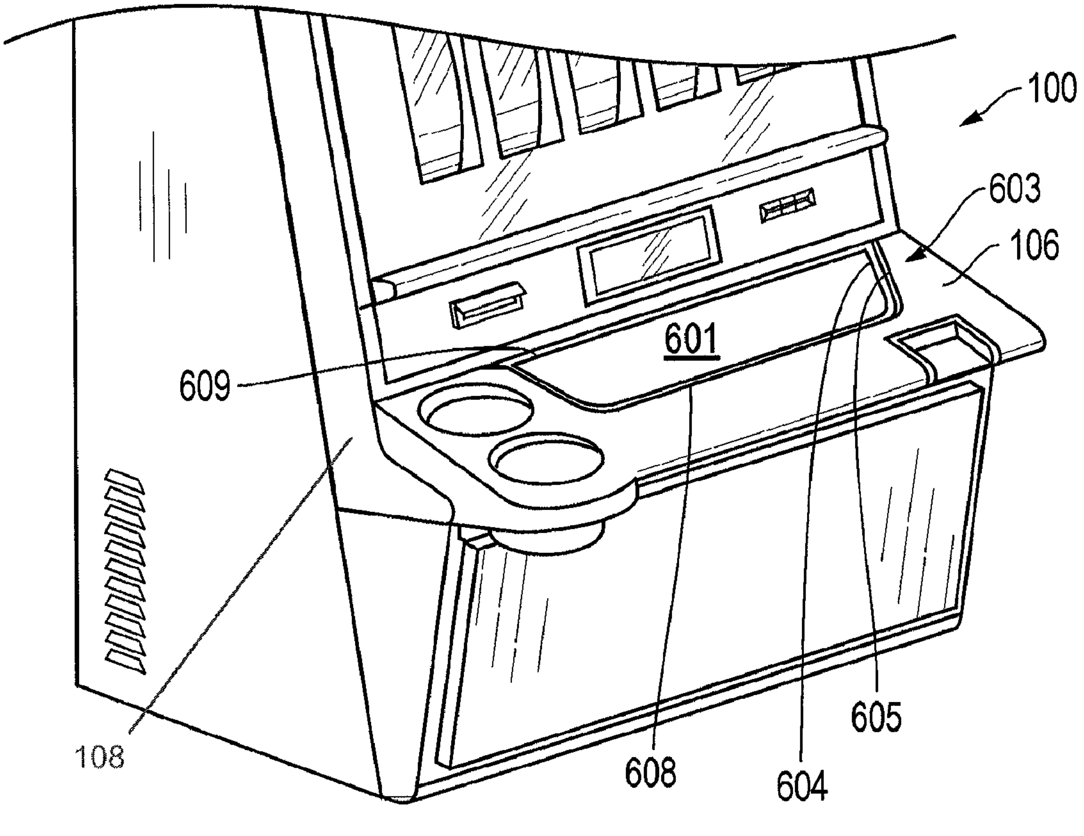
FIG. 6 is a view in perspective of the arm rest portion of the gaming machine shown in FIG. 1, but with the button panel removed.

FIG. 6 shows a lower portion of gaming machine 100 with button panel 105 removed from armrest 106. Armrest 106 in this embodiment represents or includes a button panel frame defining a central opening (button panel opening) 601 having a peripheral recess 603 for receiving button panel 105. Recess 603 defines a support ledge (panel support surface) 604 and a support side 605. In the illustrated embodiment shown in FIG. 6, recess 603 extends around the entire periphery of opening 601. Other forms of the invention may be configured with simply a support ledge 604 extending slightly into the area of the button panel receiving opening 601. Also, neither the recess nor the support ledge need be continuous around the entire periphery of opening 601. Preferred forms of the invention include recess 603 or at least a projecting support ledge (panel support surface) at least in some locations spaced apart along a front edge (front boundary) 608 of armrest 106. Recess 603 or at least an intermittent projecting support ledge is also included at least along portions of a back edge (back boundary) 609 of opening 601. Also, a capture structure will extend slightly over the support ledge along back edge 609 of opening 601 as will be described in connection with FIG. 7. It should be noted that support ledge 604 shown in FIG. 6 faces upwardly. Thus the surface defining support ledge 604 faces in a direction opposite to the inner surface of main door 108 in the area of armrest 106. In this sense the "inner surface" of main door 108 comprises the surface facing the interior of cabinet 101. This inner surface is on the side of main door 108 opposite to the outer surface visible in the exterior gaming machine views shown in FIGS. 1 and 6.

Figure 7:
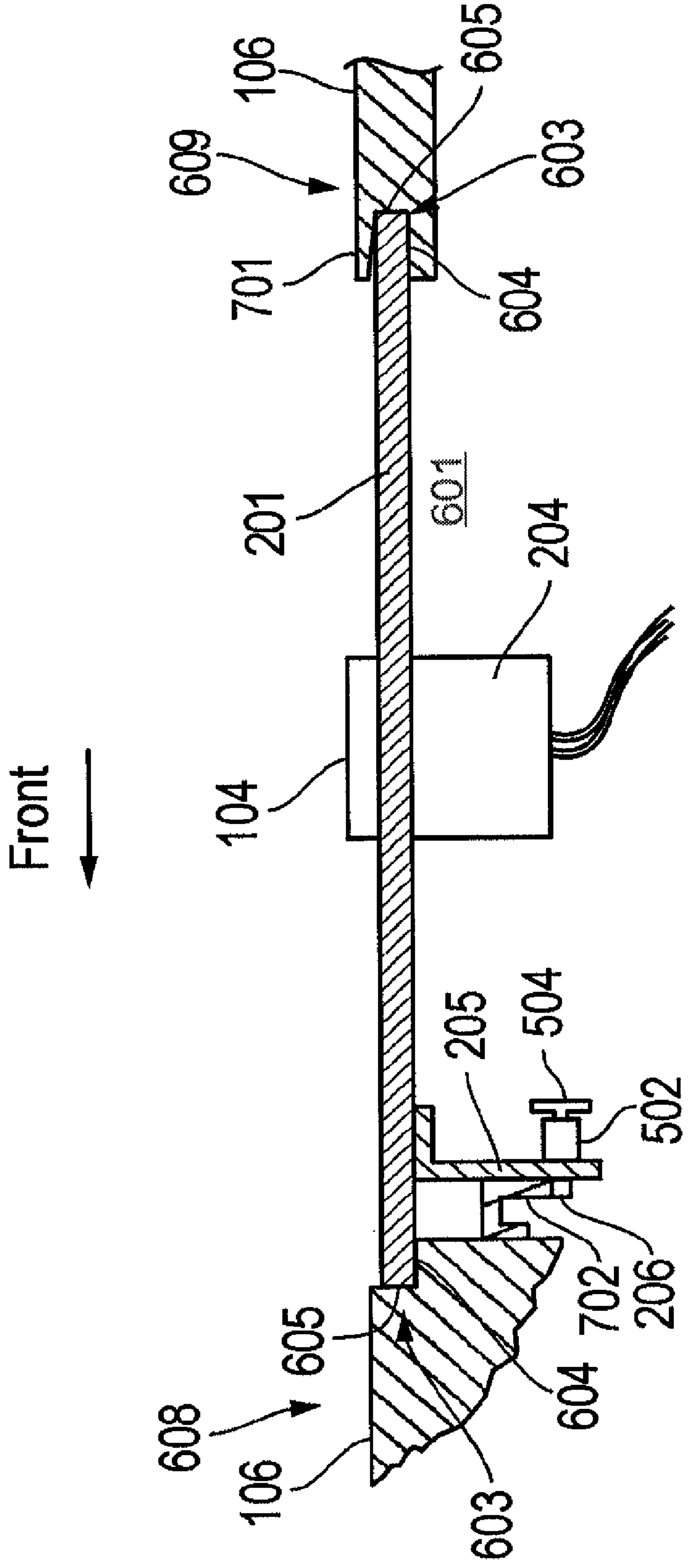
FIG. 7 is a partial section view taken along line 7-7 in FIG. 1.

The section view of FIG. 7 shows button panel 105 in an installed (operating) position in armrest 106. In this position, button panel base 201 rests in recess 603 being supported in the illustrated horizontal plane by support ledge 604, and being supported laterally by support sides 605. It will be noted from FIG. 7 that button panel base 201 is sized to fit snugly in recess 603, that is, with minimal clearance between support sides 605 and the edges of the button panel base. FIG. 7 also shows a capture structure 701 which extends slightly over the back edge of base 201 in the installed position, preferably along the entire back edge 609 of opening 601. A blocking structure 702 is shown in FIG. 7 connected to armrest 106 near the front edge of button panel base 201. In this installed position, locking flange 205 positions the extended locking projection 206 such that the lower most edge of blocking structure 702 is adjacent to the uppermost surface of locking projection 206. With the locking projection 206 in the extended position shown in FIG. 7, interference between the locking projection and blocking structure 702 prevents the front edge of button panel base 201 from being raised. Also, capture structure 701 prevents the back edge of button panel base 201 from being raised from the installed position.

In order to remove button panel 105 from the installed position shown in FIG. 7, the knob 504 associated with each locking projection 206 must be pulled to the right in the orientation of the figure to retract the respective locking projection until its distal end clears blocking structure 702. With the locking projections 206 no longer caught on blocking structure 702, the front edge of button panel base 201 may be raised upwardly leaving the opposing back edge of the button panel in place at the back edge 609 of opening 601 in armrest 106. Once the front edge of button panel base 201 is raised sufficiently so that locking flange 205 clears the front material making up armrest 106, the button panel base may be slid to the left in the orientation of the figure to remove the back edge of button panel base 201 from the slot formed by support ledge 604, support side 605, and capture structure 701. In order to accommodate raising the front edge of button panel base 201 as described above to remove the button panel from the installed position, there may be a slight clearance between capture structure 701 and the captured edge of button panel base 201 at the front of the capture structure, that is, the end of the capture structure to the left in the orientation of FIG. 5. Alternatively, capture structure 701 may be formed from a somewhat flexible and resilient material that may be deflected upwardly as the front edge of base 201 is raised, and then return to its unstressed position once base 201 is fully removed from opening 601.

In order to place button panel 105 in the installed position shown in FIG. 7, the procedure for removing the button panel described in the previous paragraph is reversed. That is, button panel base 201 is first positioned above button panel opening 601 and angled so that the back edge of the button panel base is somewhat lower than the front edge of the button panel base. From this position the back edge of button panel base 201 is slid into the slot formed by support ledge 604, support side 605, and capture structure 701 at the back edge 609 of armrest 106. The front edge of button panel base 201 may then be pivoted downwardly about an axis of rotation defined by the back edge of the button panel base to the position shown in FIG. 7. It may be necessary to pull each knob 504 and respective locking projection 206 to the right in the orientation of FIG. 5 in order to clear blocking structure 702 as the front edge of button panel base 201 is lowered into place. Once the front edge of base 201 is lowered onto the support ledge 604 at the front edge 608 of armrest 106, each knob 504 may be released to allow locking projections 206 to move to the position shown in FIG. 7 and lock button panel 105 in place. Alternatively to manually moving each locking projection to the retracted position in order to lower the front edge of base 201 to the position shown in FIG. 7, the top surface of blocking member 702 or the bottom distal surface of each locking projection 206 may be configured with a suitable sloping surface to cause the respective locking projection 206 to retract as the front edge of button panel base 201 is being lowered into position.

It should be noted that the arrangement for mounting a button panel in a gaming machine cabinet according to the present invention encompasses a number of variations on the exemplary preferred arrangement shown in the above-described drawings. For example, although button panel 105 is shown received in a button panel frame which is part of an armrest structure, a button panel according to the present invention may be received in any button panel frame that provides a button panel opening, a panel support surface such as support ledge 604, a capture structure for capturing one edge of the button panel base 201, and a blocking structure for cooperating with the locking projection(s) 206 to selectively retain the opposite edge of the button panel base. In some forms of the invention, the front edge of the area for receiving the button panel may be associated with material forming an armrest and the back edge of the area for receiving the button panel may be part of the gaming cabinet door and not part of the material making up the armrest. Also, in other variations of the present invention, the locking flange may be oriented at the back edge of the button panel base or at a lateral side of the base. In these configurations, a blocking structure will be positioned accordingly to provide the function described above in relation to blocking structure 702, and the slot such as that formed by support ledge 604, support side 605, and capture structure 701 will be located at the edge of the button panel receiving opening opposite to the blocking structure. Also, some forms of the present invention may not include a separate blocking structure 702, but may include a structure providing the function of the blocking structure 702 as part of the structure forming the button panel receiving recess. Similarly, a locking flange such as flange 205 may be integrally formed with the material making up button panel base 201.

Another variation on the form of the invention shown in the present figures relates to the function of locking projections 206. Although the illustrated locking projections 206 are described above as being biased to the extended position, a biasing force is not necessary to the present invention. Rather, locking projections 206 may be screwed or otherwise moved in any fashion from the extended position to the retracted position and from the retracted position to the extended position. Another variation within the scope of the invention relates to the number of locking projections and the coordination of multiple locking projections. Although preferred forms of the invention include two laterally spaced apart locking projections in order to securely retain the front edge of button panel 105 in place, a single locking projection may be used. Where multiple locking projections are used, one variation on the structure shown in the present figures additionally includes a connector that connects the knobs 504. Connecting the knobs with a suitable bar or other member allows both locking projections to be retracted simultaneously using one hand.

As used herein the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised September 2007), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming machine including:

(a) a cabinet that defines an interior volume and a front opening;

(b) a door pivotally connected to the cabinet so as to be pivotable between a closed position covering at least a portion of the front opening and an open position in which an inner side of the door is accessible from outside of the cabinet;

(c) a button panel frame defining a button panel opening on the door, the button panel frame including (i) a panel support surface facing oppositely to the inner side of the door, (ii) a capture structure at a first boundary of the button panel opening, and (iii) a blocking structure located at a second boundary of the button panel opening opposite to the first boundary;

(d) a button panel base having an upper side and a lower side, and also having a first edge and opposing second edge, the button panel base being sized so that when the first edge is received in the capture structure of the button panel frame the second edge is received on the panel support surface at the second boundary of the button panel opening; and (e) a locking flange extending from the lower side of the button panel base and having at least one locking projection mounted thereon, each locking projection being moveable between an extended position and a retracted position, such that when the button panel base is in an operating position in which the first edge of the button panel base is received in the capture structure of the button panel frame and the second edge of the button panel base is received on the panel support surface at the second boundary of the button panel opening, the locking projections in the extended position contact the blocking structure to retain the button panel in the operating position.

2. The gaming machine of claim 1 wherein the panel support surface of the button panel frame is formed in a recess along the second boundary of the button panel opening and along two lateral sides of the button panel opening, and wherein the button panel base is sized to fit snugly in the recess when the first edge of the button panel base is received in the capture structure of the button panel frame.

3. The gaming machine of claim 1 wherein the locking flange includes two laterally spaced apart locking projections, each being connected to a respective positioning knob.

4. The gaming machine of claim 3 wherein each locking projection is biased to the extended position with a suitable biasing spring.

5. The gaming machine of claim 1 wherein the capture structure extends along substantially the entire length of the first boundary of the button panel opening.

6. A button panel structure for a gaming machine, the gaming machine having a cabinet that defines an interior volume and a front opening and also having a door pivotally connected to the cabinet so as to be pivotable between a closed position covering at least a portion of the front opening and an open position in which an inner side of the door is accessible from outside of the cabinet, the button panel structure including:

(a) a button panel frame defining a button panel opening on the door, the button panel frame including (i) a panel support surface facing oppositely to the inner side of the door, (ii) a capture structure at a first boundary of the button panel opening, and (iii) a blocking structure located at a second boundary of the button panel opening opposite to the first boundary;

(b) a button panel base having an upper side and a lower side, and also having a first edge and opposing second edge, the button panel base being sized so that when the first edge is received in the capture structure of the button panel frame the second edge is received on the panel support surface at the second boundary of the button panel opening; and (c) a locking flange extending from the lower side of the button panel base and having at least one locking projection mounted thereon, each locking projection being moveable between an extended position and a retracted position, such that when the button panel base is in an operating position in which the first edge of the button panel base is received in the capture structure of the button panel frame and the second edge of the button panel base is received on the panel support surface at the second boundary of the button panel opening, the locking projections in the extended position contact the blocking structure to retain the button panel in the operating position.

7. The button panel structure of claim 6 wherein the panel support surface of the button panel frame is formed in a recess along the second boundary of the button panel opening and along two lateral sides of the button panel opening, and wherein the button panel base is sized to fit snugly in the recess when the first edge of the button panel base is received in the capture structure of the button panel frame.

8. The button panel structure of claim 6 wherein the locking flange includes two laterally spaced apart locking projections, each locking projection being connected to a respective positioning knob.

9. The button panel structure of claim 8 wherein each locking projection is biased to the extended position with a suitable biasing spring.

10. The button panel structure of claim 6 wherein the capture structure extends along substantially the entire length of the first boundary of the button panel opening.

11. A method of installing a button panel in a gaming machine, the gaming machine having a cabinet that defines an interior volume and a front opening and also having a door pivotally connected to the cabinet so as to be pivotable between a closed position covering at least a portion of the front opening and an open position in which an inner side of the door is accessible from outside of the cabinet, the method including:

(a) with the door of the gaming machine in the open position, positioning a button panel base above a button panel frame on the door, the button panel frame defining a frame opening having a first boundary and a second boundary opposite to the first boundary, the button panel frame also including a support surface formed around the frame opening;

(b) positioning a first edge of the button panel base in a capture structure on the first boundary of the frame opening;

(c) with the first edge of the button panel base positioned in the capture structure, rotating a second edge of the button panel base about the first edge of the button panel base until the second edge of the button panel base contacts the support surface; and (d) extending a first locking projection located beneath the button panel base to an extended position to engage a blocking structure associated with the button panel frame, the engagement between the first locking projection and the blocking structure preventing the button panel base from being removed from the support surface of the button panel frame, thereby installing the button panel in the gaming machine.

12. The method of claim 11 wherein extending the first locking projection is performed with a spring biasing force.

13. The method of claim 11 further including extending a second locking projection located beneath the button panel base to an extended position to engage a second blocking structure associated with the button panel frame.

* * * * *